(12) United States Patent
Michelson et al.

(10) Patent No.: US 6,665,730 B1
(45) Date of Patent: Dec. 16, 2003

(54) METHOD AND APPARATUS FOR TRANSACTION ROUTING IN A CONNECTION-ORIENTED PACKET NETWORK USING A NON-FAULT-TOLERANT DIRECTORY SERVER

(75) Inventors: Steven M. Michelson, Freehold, NJ (US); Mark A. Ratcliffe, Oakhurst, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/464,398

(22) Filed: Dec. 16, 1999

(51) Int. Cl.[7] ................................................. G06F 15/16
(52) U.S. Cl. ....................... 709/238; 709/205; 709/206; 709/240
(58) Field of Search ................................ 709/245, 238, 709/241, 244, 230, 229, 218, 219; 370/260

(56) References Cited

U.S. PATENT DOCUMENTS

| | | | |
|---|---|---|---|
| 4,939,726 A | | 7/1990 | Flammer et al. |
| 5,511,168 A | | 4/1996 | Perlman et al. |
| 5,633,866 A | | 5/1997 | Callon |
| 5,633,869 A | * | 5/1997 | Burnett et al. ............... 370/396 |
| 5,740,423 A | | 4/1998 | Logan et al. |
| 5,757,796 A | * | 5/1998 | Hebb ........................... 370/393 |
| 5,825,772 A | | 10/1998 | Dobbins et al. |
| 5,854,899 A | | 12/1998 | Callon et al. |
| 5,864,563 A | | 1/1999 | Ratcliffe |
| 5,917,823 A | | 6/1999 | Benning et al. |
| 5,920,562 A | | 7/1999 | Christie et al. |
| 5,936,959 A | * | 8/1999 | Joffe ............................ 370/397 |
| 5,940,492 A | | 8/1999 | Galloway |
| 6,035,105 A | * | 3/2000 | McCloghrie et al. ....... 370/351 |
| 6,282,191 B1 | * | 8/2001 | Cumberton et al. ........ 370/352 |
| 6,327,267 B1 | * | 12/2001 | Valentine et al. ............ 370/466 |
| 6,343,083 B1 | * | 1/2002 | Mendelson et al. ......... 370/466 |
| 6,343,322 B2 | * | 1/2002 | Nagami et al. ........... 370/395.3 |
| 6,381,634 B1 | * | 4/2002 | Tello et al. .................. 709/206 |

OTHER PUBLICATIONS

Schneider, H., "The Concept of Virtual Paths and Virtual Channel is ATM–networks", Digital Communications, 1990. 'Electrical Circuits and Systems for Communications'. Proceedings, 1990 International Zurich Seminar on Mar. 5, 1990–Mar. 8, 1990, pp. 63–72.*

* cited by examiner

Primary Examiner—Hosain Alam
Assistant Examiner—Shabana Qureshi

(57) ABSTRACT

A transaction-based routing system applies particular routing procedures wherein one example uses Global Title Translation ("GTT") techniques for a connection-oriented packet network. The network comprises a plurality of nodes including intermediate and edge nodes. Initially, intermediate nodes in the network receive data messages including originating node identifiers and first translation requests from originating edge nodes and route these messages, based on the first translation requests, over selected network routing paths to destination edge nodes. In response, intermediate nodes receive response data messages including the originating node identifiers and second translation requests from destination edge nodes and route these response messages, based on the second translation requests, over selected network routing paths to the originating nodes. These routing procedures help reduce the complexity of logical connectivity in the network.

26 Claims, 5 Drawing Sheets

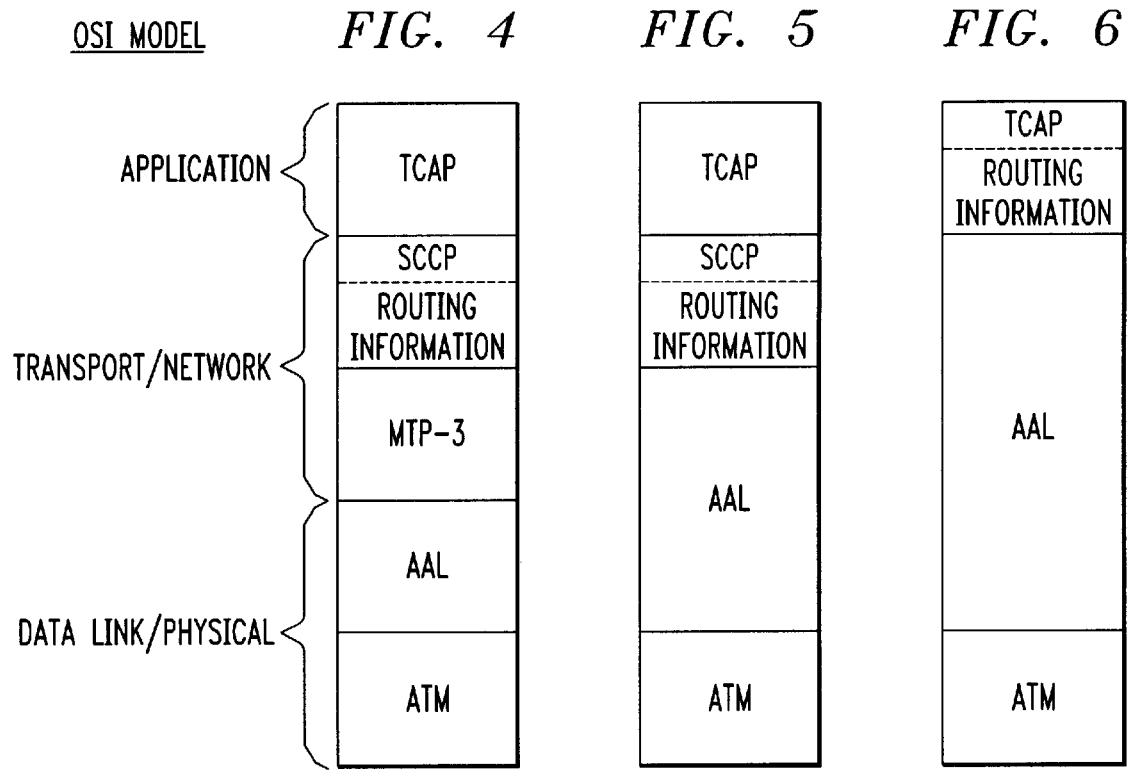

METHOD AND APPARATUS FOR TRANSACTION ROUTING IN A CONNECTION-ORIENTED PACKET NETWORK USING A NON-FAULT-TOLERANT DIRECTORY SERVER

BACKGROUND OF THE INVENTION

1. Field of the Invention

The present invention relates generally to a routing method to be used in a connection-oriented packet network. It particularly relates to a transaction-based routing method that applies particular routing procedures wherein one example uses Global Title Translation ("GTT") techniques for query and response messaging in an ATM network.

2. Background Art

In communication networks (e.g., telecommunication, packet data, etc), addressing and routing are important network functions enabling efficient communication connectivity. Particularly, for the telecommunication network, addressing and routing are typically performed using Global Title Translation ("GTT") as described in Signaling System 7 ("SS7"), the out-of-band network control signaling system first standardized by the CCITT (now "ITU-T") in 1980. SS7 itself is a connection-less packet network and provides network control signaling for a telecommunications switching network, a circuit-switched network.

Specifically, GTT is a part of the SS7 sub-protocol (i.e., layer), signaling connection control part ("SCCP"). Transaction capabilities application part ("TCAP") uses the signaling connection control part ("SCCP") for the transfer of non-circuit related information between signaling-points in the system, particularly transaction-based information exchange between network entities enabling enhanced services in the telecommunications network. Examples of these services include enhanced dial-1-800 service, automated credit card calling, and virtual private networking. The TCAP protocol enables these services to access remote databases such as service control points ("SCPs") to complete call processing. An SCP can supply the translation and routing information necessary for delivering advanced network services such as translating dialed digits (e.g., 1-800 number) to the required routing number (e.g., routing telephone number). In particular, GTT, performed by signal transfer points ("STP"), comprises the process of translating a global title address of dialed digits to a point code (network code) address and application address (subsystem number) enabling call connectivity within the telecommunications network.

A connection-oriented packet network provides data transport by performing call requests to set up logical connections between communication nodes within the network. The network typically includes a plurality of nodes, devices that communicate with other devices in a communications network. The logical connections are referred to as virtual circuits or connections (VCs). Virtual circuits are connection-oriented channels typically established between two end nodes in a packet network. Switched virtual circuits (SVC) are dynamically established using call setup procedures and terminated once the data transfer has been completed. All packets transported within the network are identified as belonging to a particular virtual circuit wherein the packets are numbered sequentially and delivered in sequence-number order. Connection-oriented networks enable connection-oriented services that include sequencing, error control, file transfer, and remote terminal access. Conversely, in a connectionless network, the network delivers packets independently of each other which may result in non-sequential and unreliable delivery.

Particularly, an asynchronous transfer mode ("ATM") network is a connection-oriented packet network wherein data is routed over virtual circuits by switching/routing devices referred to as ATM switches. ATM switches allow VCs to be set up and torn down on demand by an end user.

In a typical ATM network, due to the frequency of data transport, permanent virtual circuits (PVCs) will be setup between connecting communication nodes. A permanent virtual circuit is a permanent, network-assigned virtual circuit. It typically provides the equivalent of a dedicated private line service over a packet network between nodes. Data transfer occurs as with SVCs, but no call setup or termination is required. A soft PVC is a PVC that is setup via signaling between all nodes involved in the circuit. The signaling is triggered through commands entered at one of the end nodes of the circuit, either directly or through an operations system. Once established, a soft PVC operates identically to a PVC. Particular ATM terminology refers to a PVC as a virtual channel ("VC") or virtual path ("VP") PVC. A virtual path PVC is also known as permanent virtual paths ("PVP"). A PVP is a set of connection-oriented channels between two end nodes in a packet network. A PVP is a virtual path that provides the equivalent of a set of dedicated private line services over a packet network. FIG. 1 shows the relationship between the physical circuit and the logical virtual path (VP) and virtual channel (VC) connections in an ATM network. Once defined, a PVP requires no setup operation before data is sent and no disconnect operation after data is sent. Other examples of connection-oriented packet networks include X.25 and Frame Relay.

A typical routing topology within an ATM network includes a plurality of interconnected communication nodes that provide end-to-end communication services. These interconnected nodes are commonly a combination of edge nodes and intermediate nodes. Edge nodes typically are connected to end systems ("ES"). End systems typically comprise end-user customer premises equipment ("CPE"). Intermediate nodes are connected to edge nodes as well as other intermediate nodes. Commonly, the interconnected communication nodes of the ATM network can be any combination of switches, databases, directory servers, or other ATM devices. FIG. 2 shows a representative example of the nodal interconnections within an ATM network providing end-to-end service connectivity.

In a specific application, switch nodes query database nodes within the network during a transaction. This database transaction comprises a query message and its corresponding response message communicated between the switch and the database. Databases are nodes that typically contain network and customer information which can be queried by other nodes in the communications network. Commonly, the query messages and response messages from the databases are sent over PVCs that are established between every switch and database within the network. In a network of 300 switches and 150 databases, 45,000 PVCs are therein required to establish complete connectivity in the network. The outlaying of these connections greatly increases network management costs as well as creating traffic control and distribution problems.

There is a need to simplify PVC provisioning within an ATM network particularly for transaction-based routing. There is also a need to effectively and efficiently route transaction-based messages within the network without requiring a fault-tolerant directory server to provide intermediate node connectivity.

SUMMARY OF THE INVENTION

The present invention overcomes the previously mentioned disadvantages by providing an intermediate node that applies particular routing procedures including GTT techniques to effectively route data messages and response messages within a connection-oriented packet network. The intermediate node advantageously comprises a non fault-tolerant directory server that is connected via permanent virtual circuits to switch and database edge nodes for query and response messaging within an ATM network. Based on information in the received message, the intermediate node translates the destination address to a network routable address and determines an appropriate network routing path to effectively route the transaction-based message to the intended destination node.

BRIEF DESCRIPTION OF THE DRAWINGS

FIG. 4 is a protocol stack used by the present invention

FIG. 5 is an alternative protocol stack used by the present invention

FIG. 6 is another alternative protocol stack used by the present invention

DETAILED DESCRIPTION

The present invention applies particular routing procedures in a connection-oriented packet network wherein one example applies Global Title Translation ("GTT") techniques. GTT is a part of Signaling System 7 ("SS7") as specified in the 1988 CCITT Recommendations on CCITT, Q.700–Q.795, Geneva 1988. The present invention further relates to ATM network routing particularly ATM addressing functions. These functions are specified in User-Network Interface ("UNI") 3.1, ATM Forum, af-uni-0010.02, 1994; UNI 4.0, ATM Forum, af-sig-0061.000, July 1996; Integrated Local Management Interface ("ILMI") 4.0, ATM Forum, af-ilmi-0065.000, September 1996; ATM Name System ("ANS") 1.0, ATM Forum, af-saa-0069.000, November 1996; Information Technology—Open Systems Interconnection ("OSI") X.213, ITU-T, November 1995; Information Technology—Technology and Information Exchange Between Systems, ISO/IEC 8348, 1993; Private Network-Network Interface, 1.0 Addendum (Soft PVC MIB), ATM Forum, af-pnni-0066.00, September 1996; and Private Network-Network Interface Specification, 1.0, ATM Forum, af-pnni-0055.00, March 1996.

The present invention takes the process of translating an originating device address or other information to a network routable address and applies it to a connection-oriented packet transport network rather than a connection-less packet network. The present invention will be primarily described using an ATM network architecture. Therefore, it is noted that particular non-critical aspects of ATM network architecture and routing procedures are not described in great detail as they are not critical to the present invention and these aspects are well-known in the relevant field of invention. Also, it is noted that those skilled in the art will appreciate that the present invention may be equally applied to any connection-oriented packet network that establishes a logical connection path between source and destination using virtual circuits for message routing that requires a response from the destination node (e.g., Frame Relay, X.25, etc.)

Figure 3:
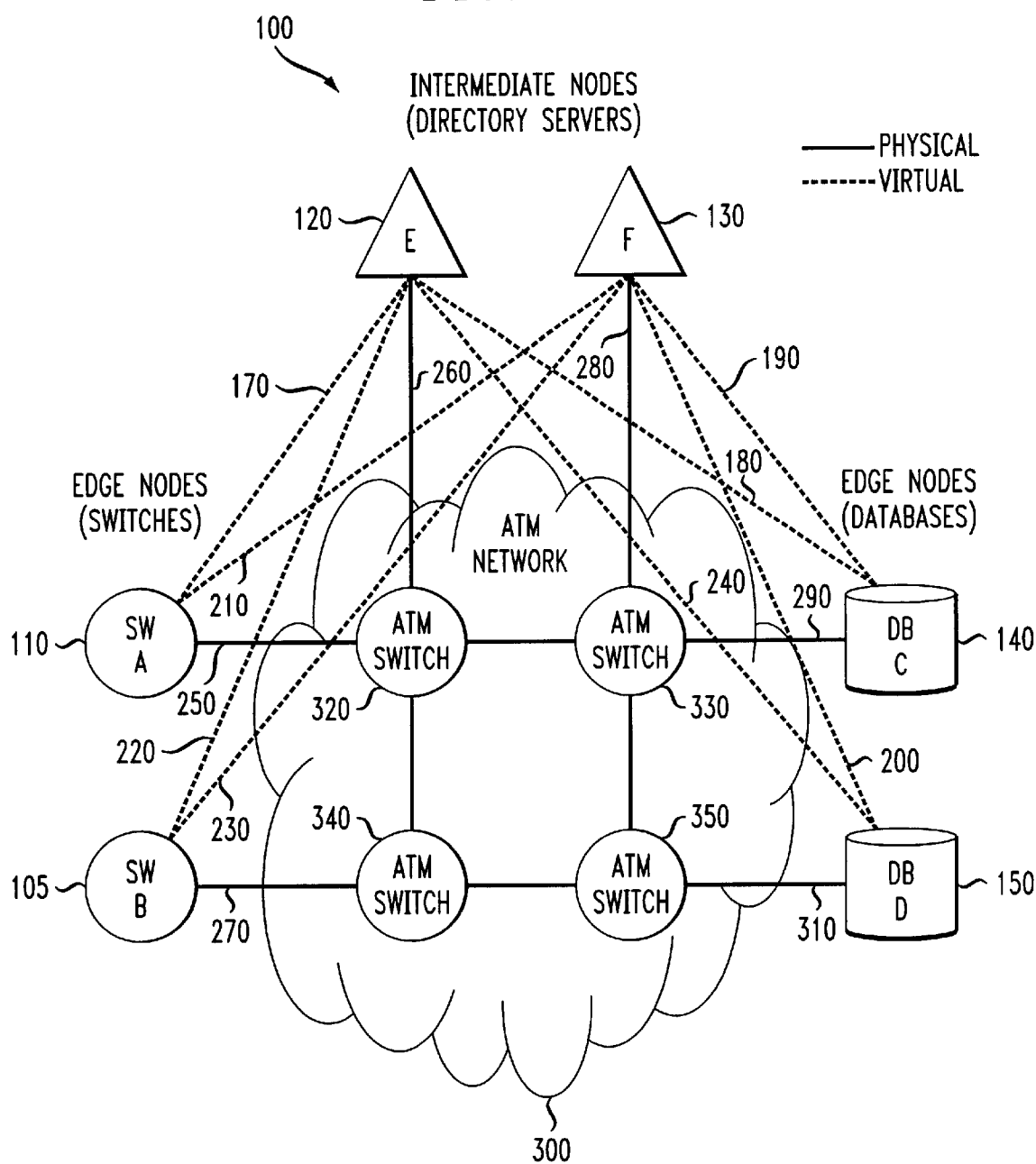
FIG. 3 illustrates a block diagram of an embodiment of the present invention

FIG. 3 illustrates a representative connection-oriented packet network 100 that uses particular routing procedures. Advantageously, the routing procedures are used within an ATM network comprising a plurality of nodes. Data messages (packets) are routed over the network using ATM cells. The end-to-end network architecture shown includes edge nodes 105, 110, 140, and 150 and intermediate nodes 120, 130. It is noted that the nodes shown are exemplary and the network is not limited to this particular number of nodes. In a preferred routing architecture, edge nodes 105, 110 are switches, intermediate nodes 120, 130 are directory servers, and edge nodes 140, 150 are databases. Directory servers 120, 130 are preferably non fault-tolerant thereby reducing network architecture costs and enabling redundancy in the network. All nodes are interconnected to an ATM network 300 comprised of ATM switches 320, 330, 340, and 350. In FIG. 3, physical connections 250, 260, 270, 280, 290, and 310 between these nodes and the ATM network 300 are represented by solid lines while dotted lines 170, 180, 190, 200, 210, 220, 230, and 240 represent the virtual (logical) connections between these nodes.

Advantageously, no direct virtual connections exist between switch nodes 105, 110 and database nodes 140, 150. To perform transaction-based routing between the switch nodes 105, 110 and database nodes 140, 150 in the network, a number of permanent virtual circuits ("PVCs") 170–240 must be established both between the switch nodes 105, 110 and the directory server nodes 120, 130 and between the directory server nodes 120, 130 and the database nodes 140, 150.

An exemplary transaction requiring network routing is a database query originated by a switch node in the network that does not possess the destination address for the intended database node. The directory server 120, 130 enables this type of communication by performing two functions. One function performed is a directory function which determines the address of the destination database node and routes the database query to the database node. The other function performed, requiring application of routing procedures, is a routing function which routes the query message to the database and routes the response message received from the database to the switch that initiated the query. To perform this function, the directory server node supports a translation request included in the query and the response message.

An illustrative example is a transaction-based communication between switch node 105 and database node 140 that uses directory server nodes 120, 130 for directory and routing functions. It is noted that switch 105, database 140, and directory servers 120, 130 are solely used herein as representative examples of a transaction-based topology and the present invention is not limited to these three particular nodes and may use any number of the plurality of nodes within the network to complete the transaction-based communication.

Switch 105 initially formulates a database query data message, including its own node identifier in the application part of, the message which provides a unique address for switch 105. Advantageously, the node identifier is a common language location identifier ("CLLI") code. CLLI codes, most commonly used in the telecommunication network, are 11-digit alphanumeric codes that identify physical locations and equipment such as buildings, central offices, poles, and antennas. One CLLI code example is FRHDNJ0202T which identifies a 4ESS switch in Freehold, N.J. It is noted that CLLI codes are only one example of a node identifier to be used with the present invention, but other types of node identifiers may be used that provide a unique address for the originating switch. These other types may include, but are not limited to IP addresses, equipment serial numbers, longitude/latitude coordinates, or any other type of numerical, alphabetical, or alphanumeric combination that provides a unique node address.

Also, the query message includes a translation request preferably included in the transport or application layer of the message. To perform the routing function, the directory server 120, 130 will need to translate the address for the destination node into a network routable address. Following formulation of the database query message, the originating switch node 105 selects a directory server to use for the directory function. Any type of appropriate selection criteria (e.g., load-sharing, idle time, error rates, connection length, etc) may be used that selects a directory server which will receive the database query message. Once the directory server is chosen, a permanent virtual circuit ("PVC") connecting the switch node 105 to the chosen directory server is selected for routing, and the message is routed to the directory server on the selected PVC. In the present example, originating switch node 105 routes the message to directory server node 120 over selected PVC 170.

To perform the necessary directory and routing functions for each query and response message, each message needs to contain a node identifier (e.g., CLLI code) for the node originating the message, routing information used to make a translation, and a translation request. The routing information used to make a translation includes any information regarding the originating node, destination node, connection path, or any other information enabling the directory server to determine the actual destination node for the data transaction. This routing information can specifically include, but is not limited to global title address ("GTA"), automatic number identification ("ANI"), directory number ("DN"), or originating line information ("OLI"). Using the routing information, the directory server is able to determine the destination node for the message and then translates the address for the destination node to a network routable address based on the translation request. Advantageously, this routable address is an ATM end system address ("AESA") used by the connection-oriented packet network 100 to route the message to its proper destination. AESA is one of the fundamental classes of ATM address formats used for ATM network routing and is referred to in ATM Forum UNI 3.0 and 3.1 specifications. Translation is preferably performed using the ATM Name Service ("ANS") and the ATM Private Network-Node Interface ("PNNI") protocol. ANS is a native ATM application primarily used for resolving non-ATM addresses (e.g., names) into ATM addresses to facilitate ATM network routing while PNNI is a protocol used for distributing addressing information and routing messages between nodes and networks. ANS is referred to in ATM Forum ANS 1.0 specification while PNNI is referred to in ATM Forum PNNI 1.0 specification and addendum.

FIGS. 4, 5, 6 show the alternative protocol stacks used by the directory server 120, 130 and their corresponding Open System Interconnection ("OSI") layer for the network 100. FIG. 4 shows a particular protocol stack including TCAP, SCCP, Message Transfer Part-3 ("MTP-3"), ATM Adaptation Layer ("AAL"), and ATM layers which comprise the application, transport, network, data link, and physical OSI layers of the network. In FIGS. 4 and 5, the protocol stack is arranged using GTT techniques wherein the routing information is contained in the SCCP layer which comprises the transport layer of the network 100. In FIG. 4, the MTP-3 layer is included in the protocol stack. FIG. 6 shows another alternative protocol stack wherein the routing information is contained in the TCAP layer which comprises the application layer of the network 100. Each protocol stack provides the directory server 120, 130 with the necessary information enabling efficient routing and addressing in the network 100.

Figure 7:
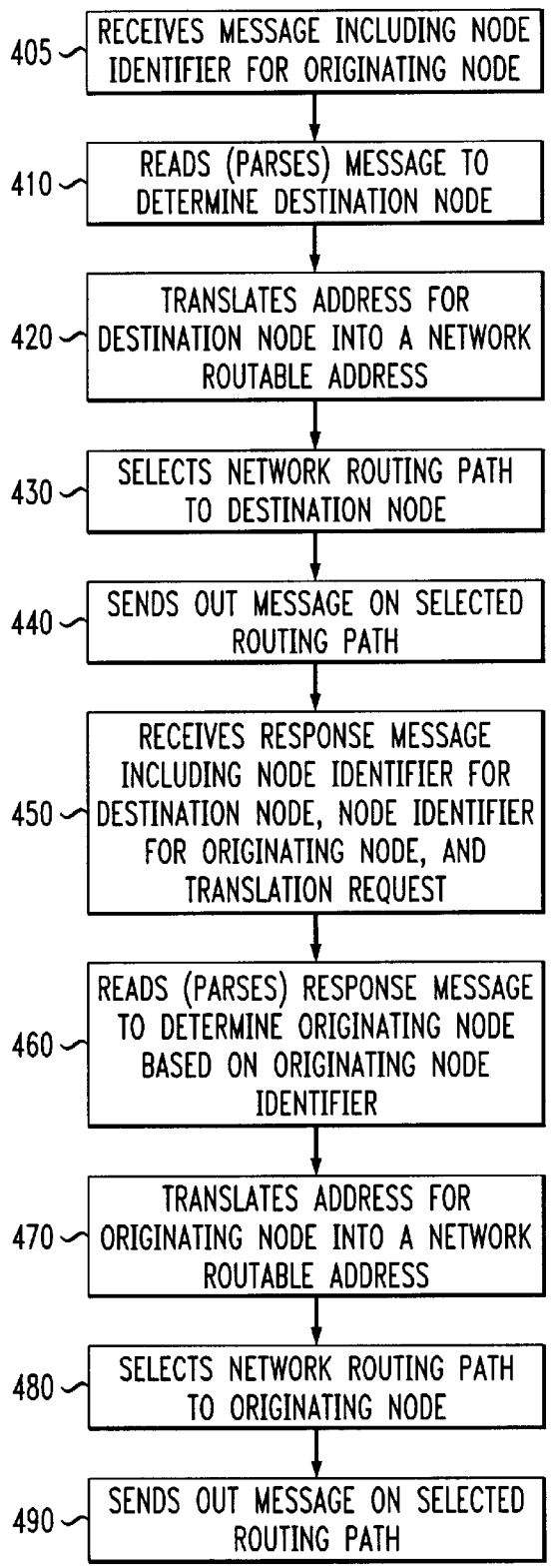
FIG. 7 is a flowchart for describing method performed by intermediate node in accordance with an embodiment of the present invention

FIG. 7 shows a flowchart presenting the procedures followed by directory servers node 120, 130 to complete the transaction-based communication between switch node 105 and database node 140. Referring to FIG. 7, at step 405, directory server 120 receives the query message from originating switch node 105 wherein the message includes the node identifier for the originating node 105, routing information, and the translation request. At step 410, directory server 120 reads (parses) the received message to determine the destination database node. The destination database node is determined based on the routing information in the message and information stored locally (e.g., local memory) at directory server 120. Advantageously, the directory server can use a local look-up table to find the network routable address (e.g., AESA) based on the GTA, ANI, DN, or OLI contained in the received message to route the message to the destination node. Once this network routable address is determined, at step 420 the directory server translates the originally received address for the destination node into this routable address. This translation function performed by the directory server 120 effectively translates the address in the header of the received message to a physical outgoing switch port address providing connectivity to the determined destination node. At step 430, once the destination database and its network routable address is identified, a network routing path (PVC) to the database is selected. At step 440, the message is sent on the selected PVC 180 to the identified database 140.

At the destination database 140, the database 140 receives the query message. Database 140 then reads (parses) the message and does any required service processing (e.g., update files, etc). Database 140 then formulates a response message, inserting the node identifier of the originating switch node 105 (received in the query message) and a node identifier for itself (i.e., destination database node 140). Again, database node 140 advantageously uses a CLLI code as its node identifier. Database 140 also includes a translation request indication that will instruct the receiving directory server to route the response message based on the originating switch node identifier. Database 140 then selects a directory server to use for the routing function which can be a different directory server from the directory server 120 initially used to route the query message. Again, any type of appropriate selection criteria (e.g., load-sharing, idle time, error rates, connection length, etc) may be used that selects a directory server which will receive the response message. Once the directory server is chosen, a permanent virtual circuit ("PVC") connecting the destination database node 140 to the chosen directory server is selected for routing, and the message is routed to the directory server on the selected PVC. In the present example, destination database node 140 routes the message to directory server node 130 over selected PVC 190.

Again referring to FIG. 7, at step 450 directory server node 130 receives the response message wherein the message includes a node identifier for the destination database node 140, a node identifier for the originating switch node 105, and a translation request. At step 460, the directory server node reads the response message and determines the originating node based on the originating node identifier. Again, the directory server node may advantageously use a local look-up table to find a network routable address corresponding to the originating node. At step 470, based on the translation request, the directory server node translates the originally received address for the originating node to the network routable address (e.g., AESA) using the locally stored look-up table. At step 480, a PVC connected to the originating switch node 105 (determined from the translation step) is selected. At step 490, the response message is routed over the selected PVC 210 to the originating switch node 105 to complete the transaction-based routing scheme.

Figure 1:
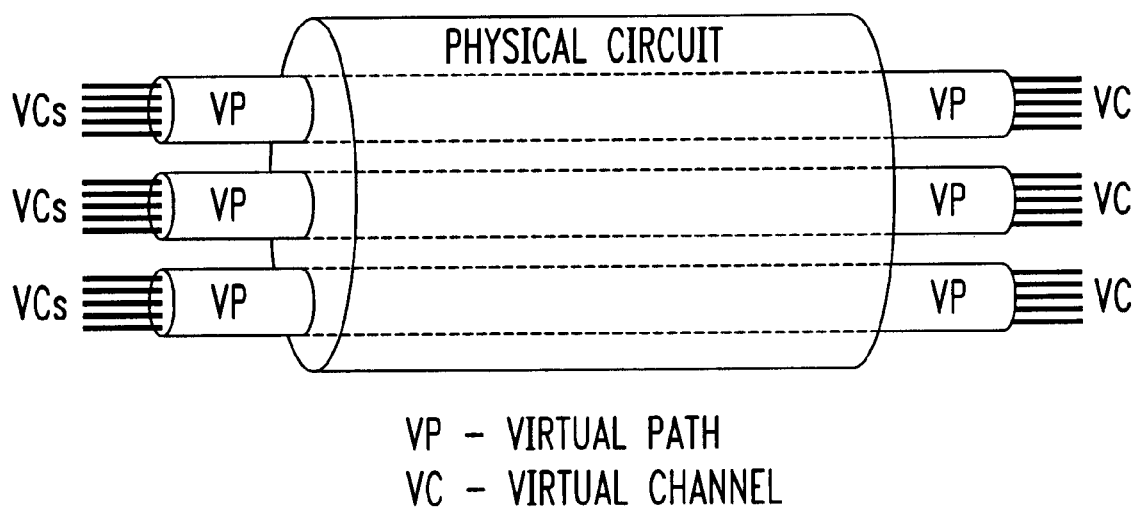
FIG. 1 is a block diagram of channel relationship in an ATM network
Figure 2:
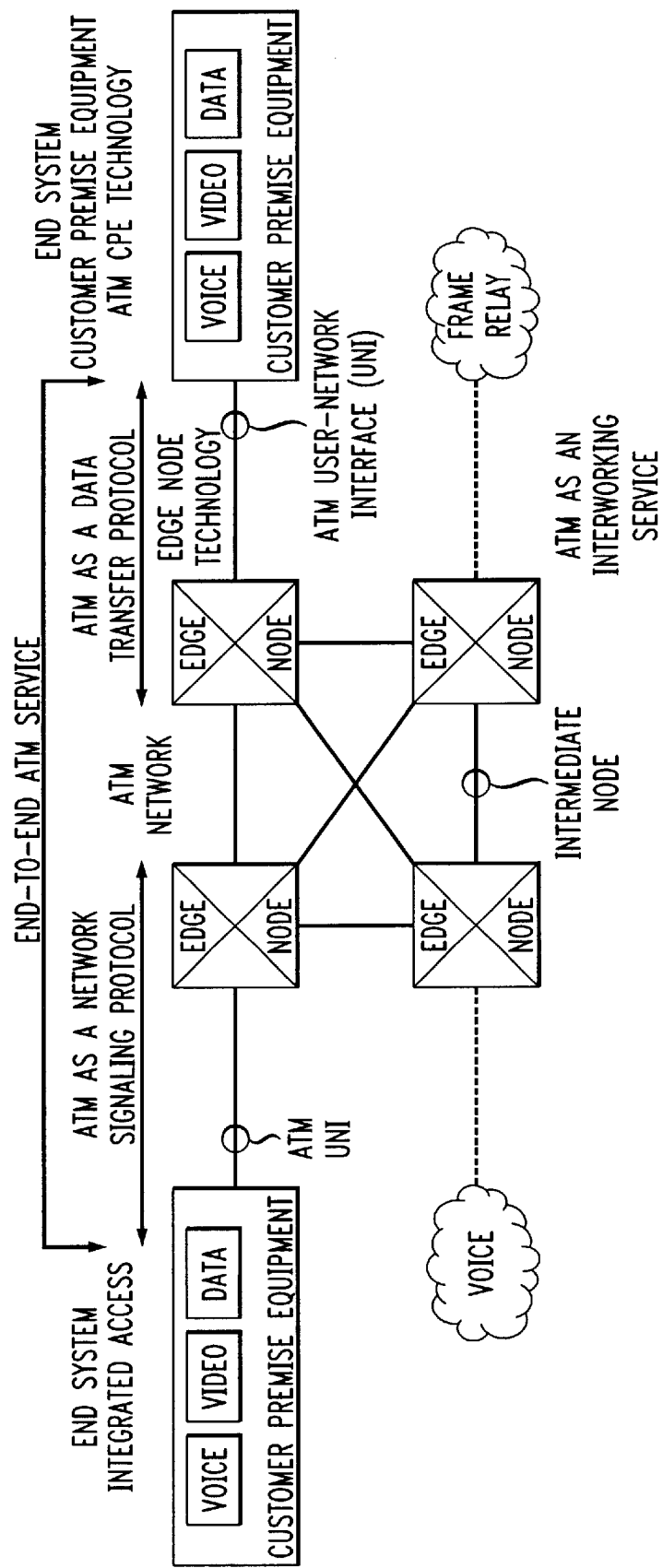
FIG. 2 is a block diagram of a representative ATM network

An alternative embodiment of the present invention may include mapping node identifiers for multiple intermediate nodes or destination databases to one AESA therein enabling redundancy in the network for better traffic distribution or protection against network failures. Particularly, ATM networks support group addressing which allows multiple nodes to be assigned one group AESA. In reference to the illustrative embodiment shown in FIG. 1, intermediate nodes 120, 130 can be mapped to a group AESA therein enabling response message routing to either one intermediate node or both intermediate nodes based on some pre-determined criteria (e.g., load-sharing, distance, traffic measurements, message priority, etc.). Also, a query message can be mapped to a group AESA which points to one of several database nodes.

As previously mentioned, an alternative response message path can be chosen by the responding database node involving a different directory server from the one sending out the original database query. However, even if an alternative response path is not chosen, the selection process for the response path directory server should be independent from the actual directory server chosen for the initial message routing. By choosing an alternative directory server, customized traffic management, distribution, and redundancy measures can be more easily implemented in the network and the initial directory server is not required to be fault tolerant.

The present invention provides effective and efficient routing procedures enabling transaction-based messaging in a connection-oriented packet network. When the address for an intended recipient is initially unknown, the data message can still be effectively routed to the destination node based on information in the data message and translating at least a portion of the information into a network routable address. The routing procedures described help reduce the number of permanent virtual circuits required to perform routing within the network and allow use of a non fault-tolerant directory server to help facilitate the message routing.

Although the invention is described herein using a database query ATM network example, it will be appreciated by those skilled in the art that modifications and changes may be made without departing from the spirit and scope of the present invention. As such, the method and apparatus described herein may be equally applied to any connection-oriented packet network comprising a plurality of nodes.

What is claimed is:

1. A method for routing data packets within a packet network, comprising:
   receiving a data message from an originating node in a connection-oriented packet network having a plurality of nodes, the message including a first node identifier relating to said originating node and a first request for translation;
   determining a destination node for said data message based on information in the data message;
   translating an address for said destination node to a first network routable ATM address based on said first request for translation;
   selecting a network routing path to said destination node based on said first routable ATM address;
   routing said data message to said destination node over said path, the destination node formulating and sending out a response message to said data message, the response message including the first node identifier for said originating node, a second node identifier for the destination node, and a second request for translation;
   receiving said response message from said destination node;
   determining said originating node based on said first node identifier;
   translating an address for said originating node to a second network routable ATM address based on said second request for translation;
   selecting a network routing path to said originating node based on said second routable ATM address; and
   routing said response message to said originating node.

2. The method of claim 1, further comprising:
   formulating said data message at said originating node in the network; and
   sending out said data message, the data message including said first node identifier for said originating node and said first request for translation.

3. The method of claim 1, wherein said network is an asynchronous transfer mode network.

4. The method of claim 1, wherein said node identifiers are common language location identifier codes.

5. The method of claim 1, wherein said data message is a transaction-based message.

6. The method of claim 1, wherein:
   said network is an asynchronous transfer mode network;
   said steps of routing occur over permanent virtual circuits;
   said destination node is a database, the data message received by said destination node being a database query;
   said steps of receiving being performed by a first directory server and a second directory server, respectively; and
   said originating node is an asynchronous transfer mode switch.

7. The method of claim 6, wherein said first directory server and said second directory server are non fault-tolerant.

8. The method of claim 6, wherein said first directory server and said second directory server are the same.

9. The method of claim 6, wherein said steps of translating include mapping the node identifiers to asynchronous transfer mode end system addresses enabling said message routing in the network.

10. The method of claim 9, wherein at least one of said directory servers being assigned a group ATM address.

11. The method of claim 9, wherein said node identifiers are common language location identifier codes.

12. The method of claim 1, wherein said step of determining said destination node includes determining said destination node based on information in an application layer of said message.

13. The method of claim 1, wherein said step of determining said destination node includes determining said destination node based on information in a transport layer of said message.

14. A system for routing data packets within a packet network, comprising:
a first node in a connection-oriented packet network having a plurality of nodes, said node being enabled for:
receiving a data message from an originating node in the network; determining a destination node for said data message based on information in the message, the information in the message including a node identifier for said originating node and a first request for translation;
translating an address for said destination node to a first network routable ATM address based on said first translation request;
selecting a network routing path to said destination node based on said first routable ATM address;
routing said data message to said destination node, the destination node formulating and sending out a response message to said data message, the response message including the node identifier for said originating node, another node identifier for the destination node, and a second request for translation;
a second node in the network, said second node being enabled for:
receiving said response message;
determining said originating node based on said node identifier for the originating node;
translating an address for said originating node to a second network routable ATM address;
selecting a network routing path based on said second routable ATM address based on said second translation request; and
routing said response message to said originating node.

15. The system of claim 14, wherein:
the data message being formulated at said originating node in the network, said originating node sending out said data message, the data message including said node identifier for said originating node and said request for translation.

16. The system of claim 14, wherein said network is an asynchronous transfer mode network.

17. The system of claim 14, wherein said first node and said second node are the same node in the network.

18. The system of claim 14, wherein said node identifiers are common language location identifier codes.

19. The system of claim 14, wherein said data message is a transaction-based message.

20. The system of claim 14, wherein:
said network is an asynchronous transfer mode network;
said routing occurs over permanent virtual circuits;
said destination node is a database, the data message received by said destination node being a database query;
said first and second nodes are directory servers; and
said originating node is an asynchronous transfer mode switch.

21. The system of claim 20, wherein:
said directory servers enabled for mapping the node identifiers to asynchronous transfer mode end system addresses enabling said message routing in the network.

22. The system of claim 20, wherein:
said directory servers are non fault-tolerant.

23. The system of claim 21, wherein:
at least two of said directory servers being assigned a group address.

24. The system of claim 21, wherein:
said node identifiers are common language location identifier codes.

25. The system of claim 14, wherein:
said first node determining said destination node based on information in an application layer of said message.

26. The system of claim 14, wherein:
said first node determining said destination node based on information in a transport layer of said message.

* * * * *